United States Patent
Raad

(10) Patent No.: US 8,456,051 B2
(45) Date of Patent: Jun. 4, 2013

(54) HIGH RELIABILITY GENERATOR WITH DUAL DRIVE PATH

(75) Inventor: Bernard Anthony Raad, West Linn, OR (US)

(73) Assignee: Oeco, LLC, Milwaukie, OR (US)

( * ) Notice: Subject to any disclaimer, the term of this patent is extended or adjusted under 35 U.S.C. 154(b) by 67 days.

(21) Appl. No.: 12/956,345

(22) Filed: Nov. 30, 2010

(65) Prior Publication Data
US 2011/0273043 A1  Nov. 10, 2011

Related U.S. Application Data

(60) Provisional application No. 61/331,506, filed on May 5, 2010.

(51) Int. Cl.
*H02K 7/06* (2006.01)
*H02K 7/20* (2006.01)
*H02K 16/00* (2006.01)
*H02K 23/60* (2006.01)

(52) U.S. Cl.
USPC .............. 310/83; 310/112; 310/114; 310/118

(58) Field of Classification Search
USPC ............... 310/83, 84, 112–120, 121; 74/470, 74/567; 192/90, 94; 322/40; 417/199.1, 205
See application file for complete search history.

(56) References Cited

U.S. PATENT DOCUMENTS

| | | | | |
|---|---|---|---|---|
| 3,480,810 | A * | 11/1969 | Potter | 310/54 |
| 5,418,412 | A * | 5/1995 | Brucker | 310/75 R |
| 5,424,593 | A * | 6/1995 | Vaghani et al. | 310/64 |
| 6,619,454 | B2 * | 9/2003 | Hayward | 192/40 |
| 2009/0137324 | A1 * | 5/2009 | Scherzinger et al. | 464/32 |
| 2009/0179387 | A1 * | 7/2009 | Saenz De Ugarte et al. | 277/563 |
| 2009/0184691 | A1 * | 7/2009 | Birdi et al. | 322/12 |

* cited by examiner

*Primary Examiner* — Tran N. Nguyen
*Assistant Examiner* — Jose Gonzalez Quinones
(74) *Attorney, Agent, or Firm* — Kelley Drye & Warren LLP

(57) ABSTRACT

A generator arrangement is provided in which the functionality of two typically separate electrical power generators are combined together into a single generator that forms part of a three-in-one combined multi-generator which has a dual drive path with a shear section that immunizes one of the generators (e.g., the permanent magnet generator) within the single combined multi-generator from a failure of another generator (e.g., the main generator) within the single combined multi-generator.

20 Claims, 2 Drawing Sheets

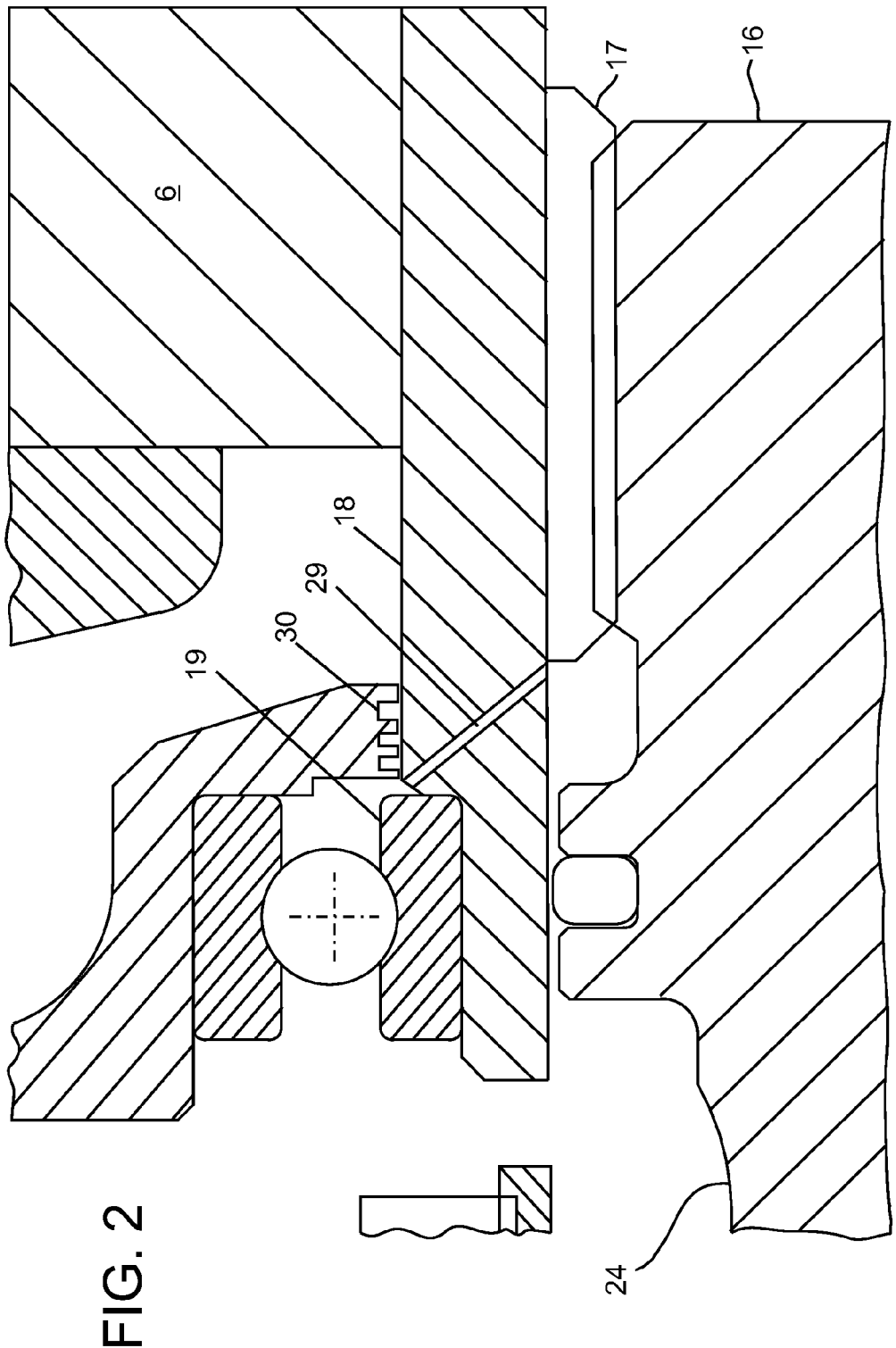

HIGH RELIABILITY GENERATOR WITH DUAL DRIVE PATH

CROSS-REFERENCE TO RELATED APPLICATIONS

This application claims the benefit of U.S. Provisional Patent Application Ser. No. 61/331,506 entitled "HIGH RELIABILITY GENERATOR WITH DUAL DRIVE PATH," filed May 5, 2010, which is incorporated herein by reference in its entirety.

BACKGROUND OF THE INVENTION

The matter disclosed herein relates to electrical generators and, in particular, to a generator arrangement in which the functionality of two typically separate electrical power generators are combined together into a single generator that comprises part of a three-in-one combined multi-generator which has a dual drive path with a shear section that immunizes one of the generators (e.g., the permanent magnet generator) within the single combined multi-generator from a failure of another generator (e.g., the main generator) within the single combined multi-generator.

Modern aircraft engines are typically controlled electronically. It is a known practice to power an electronic engine control ("EEC") by a dedicated permanent magnet generator ("PMG") that is driven independently by a drive pad on an accessory gearbox. Another pad on the same gearbox drives another generator that could be used for main or any other category of power. However, to save an accessory drive pad, it is desired to combine, on a single drive pad or power take-off ("PTO"), the EEC PMG with the PMG that is internal to and is commonly part of a brushless, three-in-one multi-generator that also includes a main generator which is typically used for aircraft applications such as providing electrical power for the deicing function on the aircraft. At the same time, to achieve hyper reliability in the single combined multi-generator, and an even higher reliability in the EEC PMG, it is desired to make the EEC PMG immune from a mechanical failure of the main or deicing generator.

Known configurations exist in the prior art for providing an electrical generator with a mechanical failure (e.g., overload) capability. In one such configuration an electrical generator has a coaxial or concentric drive shaft system that is provided with an overload shearable coupling for driving multiple outputs from a single input. A pair of coaxial, concentric telescoped drive shafts are provided as independent outputs to a pair of corresponding driven devices, such as a blower and a rotor of a generator. A singular input shaft is coupled to the pair of drive shafts by a gearbox for simultaneously rotating the coaxial drive shafts. A shear section is formed in one of the drive shafts (e.g., the outer drive shaft) for rupturing or breaking the outer drive shaft in response to an overload, mechanical failure condition thereon, while the other coaxial, inner telescoped drive shaft continues to be rotated by the singular input shaft despite the failure of the outer drive shaft.

However, this known dual coaxial or concentric drive shaft configuration has some inherent drawbacks in that the strength of the shear section formed in the outer drive shaft can be relatively too great to adequately protect the gearbox. This is because the outer drive shaft has to accommodate the inner drive shaft which itself needs to be of a certain size. Thus, in this configuration the inner diameter of the outer drive shaft is limited by the maximum outer diameter of the inner drive shaft. Also, in this known, dual coaxial drive shaft configuration the outer drive shaft (i.e., the "stub" shaft) is largely unsupported except on the splines and the "O" rings, leaving the outer drive shaft inherently unstable. Yet, the outer drive shaft, while being inherently unstable, nevertheless is attempting to support the inner drive shaft. Therefore, what is needed is an improvement to this known dual coaxial or concentric drive shaft configuration.

BRIEF DESCRIPTION OF THE INVENTION

According to an aspect of the present invention, a generator arrangement is provided in which the functionality of two typically separate electrical power generators are combined together into a single generator that comprises part of a three-in-one combined multi-generator which has a dual drive path with a shear section that immunizes one of the generators (e.g., the permanent magnet generator) within the single combined multi-generator from a failure of another generator (e.g., the main generator) within the single combined multi-generator.

According to another aspect of the present invention, the generator arrangement includes one or more bearings that support a rotor shaft, wherein the rotor shaft includes a hollow portion, and wherein a lubricating fluid passes through passages in a housing of the single generator and into the hollow portion of the rotor shaft where the lubricating fluid is pressurized by the centrifugal forces resulting from rotation, and passes through one or more orifices formed in the rotor shaft and then impinges upon the one or more bearings to thereby lubricate the one or more bearings, after which the lubricating fluid passes through one or more drains in the housing and to a gearbox.

These and other advantages and features will become more apparent from the following description taken in conjunction with the drawings.

BRIEF DESCRIPTION OF THE DRAWINGS

The foregoing and other features and advantages of the invention are apparent from the following detailed description taken in conjunction with the accompanying drawings in which:

FIG. 2 is an enlarged, detailed view of a portion of the generator arrangement of the embodiments of FIG. 1.

Figure 1:
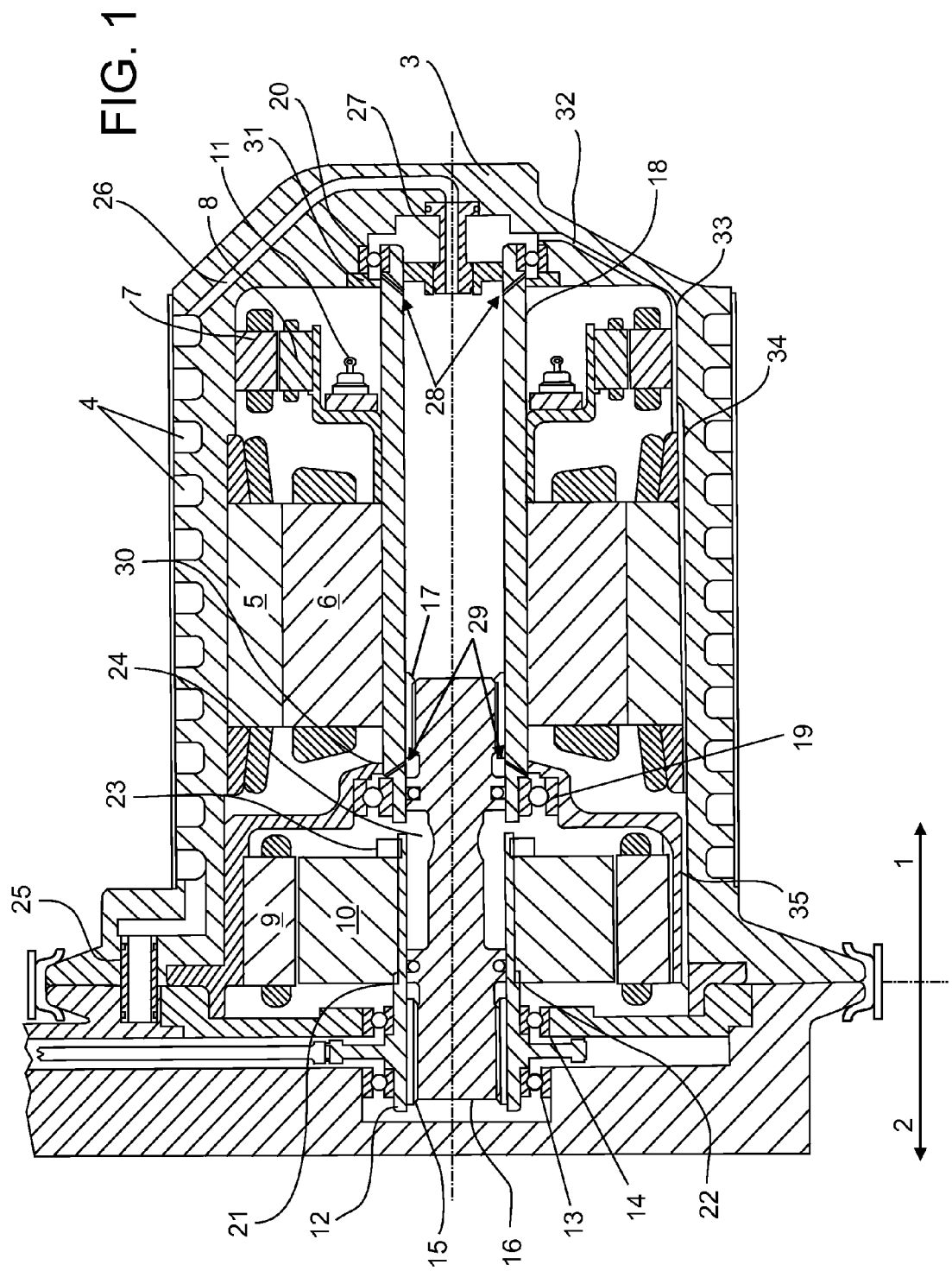
FIG. 1 is a sectional view taken longitudinally through a generator arrangement in which the functionality of two typically separate electrical power generators are combined together into a single generator that comprises part of a three-in-one combined multi-generator which has a dual drive path with a shear section that immunizes one of the generators (e.g., the permanent magnet generator) within the single combined multi-generator from a failure of another generator (e.g., the main generator) within the single combined multi-generator, according to embodiments of the present invention.

The detailed description explains embodiments of the invention, together with advantages and features, by way of example with reference to the drawings.

DETAILED DESCRIPTION OF THE INVENTION

Referring to FIG. 1, there illustrated is a sectional view taken longitudinally through a generator arrangement according to embodiments of the present invention in which the functionality of two typically separate electrical power generators are combined together into a single generator that comprises part of a three-in-one combined multi-generator which has a dual drive path with a shear section that immunizes one of the generators (e.g., the permanent magnet generator—"PMG") within the single combined multi-generator from a failure of another generator (e.g., the main generator) within the single combined multi-generator.

In particular, the single combined multi-generator generator 1 is coupled to and driven by an accessory gearbox 2 as is known in an aircraft. The gearbox 2 is shown in FIG. 1 in simplistic and partial form. The generator 1 comprises a housing 3 having fluid cooling passages 4 and enclosing the components of a classical three-in-one brushless, self-excited multi-generator. The components of the multi-generator 1 include a main generator stator 5 and rotor 6, an exciter generator stator 7 and rotor 8, and a PMG stator 9 and rotor 10. The stators 5, 7, 9 of the main generator, the exciter generator, and the PMG may be connected with or otherwise attached to the inside of the housing 3.

Working with rotating rectifiers 11, the exciter generator permits brushless operation. The PMG provides an independent source that allows for self-excitation.

Modern aircraft engines are typically controlled electronically. In the known art, an EEC is normally powered by a dedicated PMG that is driven independently by the accessory gearbox 2. However, to save an accessory drive pad within the gearbox 2, according to embodiments of the present invention it is desired to combine the functionality of the normally separate EEC PMG with that of the PMG, which is internal to the brushless, three-in-one multi-generator 1. Nonetheless, the reliability of the EEC PMG must not be affected by a failure of the main generator, which has dictated this generator configuration according to embodiments of the present invention. The main generator may be used to provide electrical power, for example, for the deicing function of the aircraft.

Referring also to FIG. 1, a drive gear 12 that may be a part of the gearbox 2 is supported by two oil lubricated bearings 13 and 14 and normally features an internal spline 15 that engages the drive or "stub" shaft 16 of the generator 1. The drive shaft 16 engages another internal spline 17 within a rotor shaft 18, which itself is supported by bearings 19 and 20. In embodiments of the present invention, the rotor shaft 18 may be hollow and may be a separate component from the drive or stub shaft 16, thereby necessitating the use of the internal spline 17 to connect together the two shafts 16, 18. In other embodiments of the present invention, the drive shaft 16 and the rotor shaft 18 may be one contiguous piece, thereby eliminating the need for the internal spline 17. The rotor shaft 18 may also be connected to the rotating rectifiers 11 and to the rotor 8 of the exciter generator.

As compared to known designs, in embodiments of the present invention the length of the drive gear 12 is extended axially (i.e., to the right as viewed in FIG. 1) to thereby support the PMG rotor 10 and to attach to and rotationally drive the PMG rotor 10 by means of tabs 21 and 22 and a jam nut 23. Other means for attaching the drive gear 12 to the PMG rotor 10 may be utilized, as should be apparent to one of ordinary skill in the art.

In addition, in embodiments of the present invention the drive shaft 16 includes a shear section 24 that is activated (i.e., causes the drive shaft 16 to shear, break or rupture) should a mechanical failure within the main generator occur that causes an over-torque or overload condition (e.g., a load in excess of a predetermined amount) within the main generator; specifically, the overload condition as applied to or on the drive or stub shaft 16. In this manner, the PMG rotor 10 is unaffected by a mechanical failure of the main generator within the single three-in-one combined multi-generator 1. As such, the PMG still functions to provide power to the EEC.

As shown in FIGS. 1 and 2, the shear section 24 may comprise a portion of the drive or stub shaft 16 that is reduced in diameter from other portions of the drive or stub shaft 16. However, the shear section 24 may comprise other types of mechanical failure structures (e.g., dissimilar materials) that cause the drive or stub shaft to shear, break or rupture. As shown, the shear section 24 may be located along the axial length of the drive or stub shaft 16 near the physical separation point of the drive gear 12 from the rotor shaft 18. However, the shear section 24 may be located at other suitable locations along the axial length of the drive or stub shaft 16.

Another aspect of embodiments of the present invention resides in the cooling and lubrication of the multi-generator 1. Cooling and lubrication fluid is transferred from the gearbox 2 to the generator 1 by a transfer tube 25. The fluid, which may be gearbox oil, is then routed around the housing through a dual helical channel represented by the passages 4, where the fluid absorbs the heat generated by the various components that are part of the generator 1. A dual helical channel is herein represented as a preferred embodiment, although it is to be understood that the shape and routing of this channel may be of any shape and routing to suit the particular application. Most of the fluid is returned to the gearbox pad by a similar transfer tube. However, a relatively small amount of the fluid is allowed to leak through passage 26 and transfer tube 27, and is injected into the hollow rotor shaft 18, where, due to centrifugal forces, the fluid gets re-pressurized and is allowed to escape from orifices 28 and 29 to directly impinge upon and lubricate the bearings 19 and 20.

A labyrinth seal 30, 31 is included to keep the fluid from entering the main generator cavity and to route the fluid through drains 32, 33, 34 and 35, from where it re-enters the accessory gearbox 2.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is:

1. An electrical generator, comprising:
   a first generator having a stator and a rotor;
   a second generator having a stator and a rotor;
   a drive gear that is connected to the rotor of the first generator to rotationally drive the rotor of the first generator; and
   a drive shaft that is connected to the drive gear to rotationally drive the rotor of the second generator, wherein a portion of the drive shaft has a shear section formed therein to break apart the drive shaft at the shear section when a predetermined load condition within the second generator occurs, wherein when the predetermined load condition causes the shear section to break apart the rotational driving of the rotor of the first generator by the drive gear continues.

2. The electrical generator of claim 1, further comprising a rotor shaft connected to the rotor of the second generator and to the drive shaft, wherein the drive shaft rotationally drives the rotor of the second generator through the rotor shaft.

3. The electrical generator of claim 2, wherein the rotor shaft is connected to the rotor of the second generator by a spline.

4. The electrical generator of claim 1, wherein the drive gear is connected to the rotor of the first generator by a spline.

5. The electrical generator of claim 1, wherein the drive gear is part of a gearbox that connects to the electrical generator.

6. The electrical generator of claim 1, wherein the shear section comprises a reduced diameter portion of the drive shaft.

7. The electrical generator of claim 1, wherein the first generator comprises a permanent magnet generator, and the second generator comprises a main generator.

8. The electrical generator of claim 7, further comprising a third generator having a stator and a rotor, wherein the third generator comprises an exciter generator, and wherein the drive shaft rotationally drives the rotor of the third generator.

9. The electrical generator of claim 8, further comprising a housing that encloses the first, second and third generators.

10. The electrical generator of claim 1, wherein the shear section is located axially along a length of the drive shaft at a predetermined location after the rotor of the first generator.

11. An electrical generator that connects to a gearbox and provides electrical power to various components on an aircraft, comprising:
   a housing;
   a first generator having a stator and a rotor;
   a second generator having a stator and a rotor;
   a third generator having a stator and a rotor;
   a drive gear that is connected to the rotor of the first generator to rotationally drive the rotor of the first generator; and
   a drive shaft that is connected to the drive gear to rotationally drive the rotor of the second generator and to rotationally drive the rotor of the third generator, wherein a portion of the drive shaft has a shear section formed therein to break apart the drive shaft at the shear section when a predetermined load condition within the second generator occurs, wherein when the predetermined load condition causes the shear section to break apart the rotational driving of the rotor of the first generator by the drive gear continues.

12. The electrical generator of claim 11, wherein the first, second and third generators are located within the housing.

13. The electrical generator of claim 11, further comprising a rotor shaft connected to the rotor of the second generator and to the rotor of the third generator and to the drive shaft, wherein the drive shaft rotationally drives the rotor of the second generator and the rotor of the third generator through the rotor shaft.

14. The electrical generator of claim 13, wherein the rotor shaft is connected to the rotor of the second generator by a spline.

15. The electrical generator of claim 11, wherein the drive gear is connected to the rotor of the first generator by a spline.

16. The electrical generator of claim 11, wherein the shear section comprises a reduced diameter portion of the drive shaft.

17. The electrical generator of claim 11, wherein the shear section is located axially along a length of the drive shaft at a predetermined location after the rotor of the first generator.

18. The electrical generator of claim 11, wherein the first generator comprises a permanent magnet generator, the second generator comprises a main generator, and the third generator comprises an exciter generator.

19. The electrical generator of claim 13, further comprising one or more bearings that support the rotor shaft, wherein the rotor shaft includes a hollow portion, and wherein a lubricating fluid passes through passages in the housing and into the hollow portion of the rotor shaft where the lubricating fluid is pressurized and passes through one or more orifices formed in the rotor shaft and then impinges upon the one or more bearings to thereby lubricate the one or more bearings.

20. The electrical generator of claim 11, further comprising one or more drain passages formed in the housing, wherein the lubricating fluid passes through the one or more drains in the housing and to the gearbox after the lubricating fluid impinges upon the one or more bearings.

* * * * *